United States Patent
Hsu

(10) Patent No.: US 7,329,996 B2
(45) Date of Patent: Feb. 12, 2008

(54) SINE WAVE LIGHT-ADJUSTING APPARATUS

(75) Inventor: Kun-Pai Hsu, Taipei (TW)

(73) Assignee: Lite Puter Enterprise Co., Ltd., Taipei County (TW)

( * ) Notice: Subject to any disclaimer, the term of this patent is extended or adjusted under 35 U.S.C. 154(b) by 82 days.

(21) Appl. No.: 11/417,105

(22) Filed: May 4, 2006

(65) Prior Publication Data

US 2007/0257624 A1 Nov. 8, 2007

(51) Int. Cl.
*H01B 39/04* (2006.01)
*H05B 37/02* (2006.01)

(52) U.S. Cl. .................. 315/209 SC; 315/291

(58) Field of Classification Search ........... 315/224, 315/209 SC, 246, 291, DIG. 5, 209 R, 307–311
See application file for complete search history.

(56) References Cited

U.S. PATENT DOCUMENTS 5,677,602 A * 10/1997 Paul et al. ................ 315/224
5,742,495 A * 4/1998 Barone ..................... 363/65
5,872,429 A * 2/1999 Xia et al. .................. 315/194
6,933,686 B1 * 8/2005 Bishel ...................... 315/293
7,019,468 B2 * 3/2006 Deurloo et al. ........... 315/291

* cited by examiner

*Primary Examiner*—Shih-Chao Chen
*Assistant Examiner*—Minh Dieu A
(74) *Attorney, Agent, or Firm*—Rosenberg, Klein & Lee

(57) ABSTRACT

A sine wave light-adjusting apparatus adjusts the input sine wave voltage and output a desired output sine wave voltage to a lamp according to the desired brightness of the lamp to achieve the light-adjusting effect by adjusting the switching period of a switch and utilizing a flywheel effect. The apparatus includes an energy-storing unit, a positive semi-period switching unit controlled by the microprocessor to execute the switching operation during the positive semi-period of the sine wave voltage, a negative semi-period switching unit controlled by the microprocessor to execute the switching operation during the negative semi-period of the sine wave voltage, a positive semi-period flywheel unit controlled by the microprocessor to conduct during the positive semi-period of the sine wave voltage, and a negative semi-period flywheel unit controlled by the microprocessor to conduct during the negative semi-period of the sine wave voltage.

12 Claims, 8 Drawing Sheets

SINE WAVE LIGHT-ADJUSTING APPARATUS

BACKGROUND OF THE INVENTION

1. Field of the Invention

The present invention relates to a sine wave light-adjusting apparatus. In particular, the present invention adjusts the switching period of a switch and utilizes a flywheel effect to achieve the light-adjusting effect.

2. Description of the Related Art

Generally, the light-adjusting apparatus of lamps is controlled by a Thyristor phase control method. It utilizes the excellent characteristics of the Thyristor to change the conduction angle by the phase control method for controlling the brightness of the lamps. Because the Thyristor is a semi-permanent element, the failure rate is low and can be used for a long time. It is extensively used for the lamps.

Reference is made in FIG. 1, which shows a circuit of a light-adjusting apparatus with a Phase Modulation method of the prior art. A light-adjusting circuit 1 composed of the Thyristor (Silicon Controlled Rectifier—SCR/Triode AC semiconductor switch—TRIAC) controls the conduction angle of the output voltage Vout on the two ends of the loading 2. FIG. 2 shows the waveform of the output voltage Vout of the prior art. In FIG. 2, the circuit of the light-adjusting apparatus can adjust and control the conduction angle of the output voltage Vout to achieve the light-adjusting effect.

However, the light-adjusting apparatus with a Phase Modulation method of the prior art controls the discontinuous and deformed output voltage Vout to provide the power for the loading. By this way, the power factor (PF) of the loading is reduced. Therefore, the inputted alternating current AC110V cannot be utilized efficiently and the energy is wasted. Furthermore, light-adjusting apparatus with a Phase Modulation method generates noise due to the control circuit output non-sine waves.

SUMMARY OF THE INVENTION

One particular aspect of the present invention is to provide a sine wave light-adjusting apparatus. In particular, the light-adjusting apparatus adjusts the input sine wave voltage and outputs a desired output sine wave voltage to a lamp according to the desired brightness of the lamp to achieve the light-adjusting effect by adjusting the switching period of a switch and utilizing a flywheel effect. Because the waveform of the voltage outputted to the lamp is a sine wave, the difference with the input sine wave voltage merely is the magnitude of the wave amplitude. Therefore, when the sine wave light-adjusting apparatus of the present invention is used for adjusting the brightness of the lamp, the power factor is higher and the energy can be adequately utilized.

The sine wave light-adjusting apparatus of the present invention is controlled by a microprocessor and adjusts a sine wave voltage for providing it to a lighting unit. The sine wave light-adjusting apparatus includes an energy-storing unit connected with the lighting unit, a positive semi-period switching unit connected with the energy-storing unit and controlled by the microprocessor to execute the switching operation during the positive semi-period of the sine wave voltage, a negative semi-period switching unit connected with the energy-storing unit and controlled by the microprocessor to execute the switching operation during the negative semi-period of the sine wave voltage, a positive semi-period flywheel unit connected with the energy-storing unit and the lighting unit and controlled by the microprocessor to conduct during the positive semi-period of the sine wave voltage, and a negative semi-period switching unit connected with the energy-storing unit and the lighting unit and controlled by the microprocessor to conduct during the negative semi-period of the sine wave voltage.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
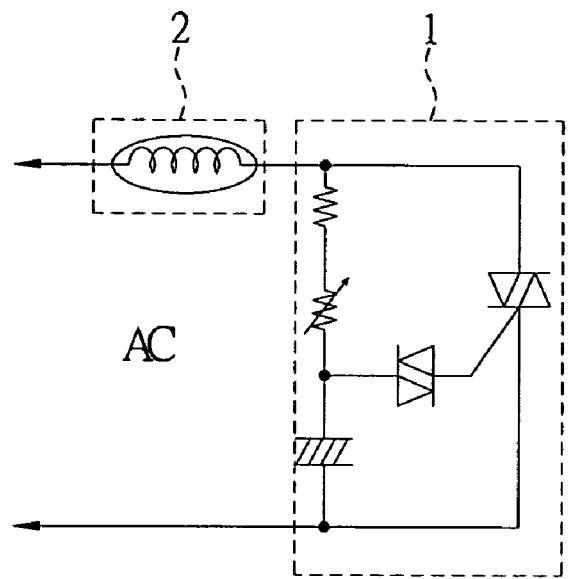
FIG. 1 is a schematic diagram of a circuit of a light-adjusting apparatus with a Phase Modulation method of the prior art.
Figure 2:
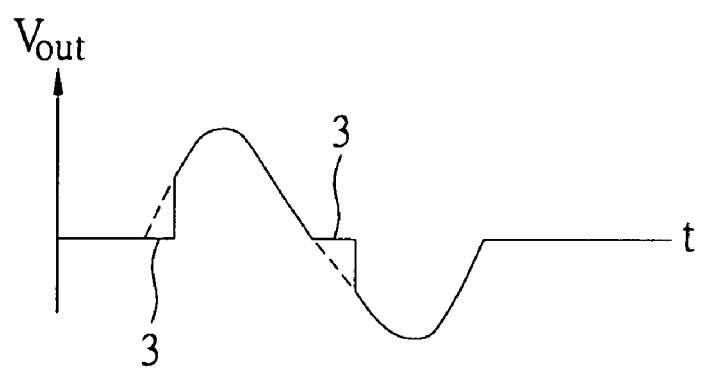
FIG. 2 is a waveform of the output voltage Vout of the prior art.
Figure 3:
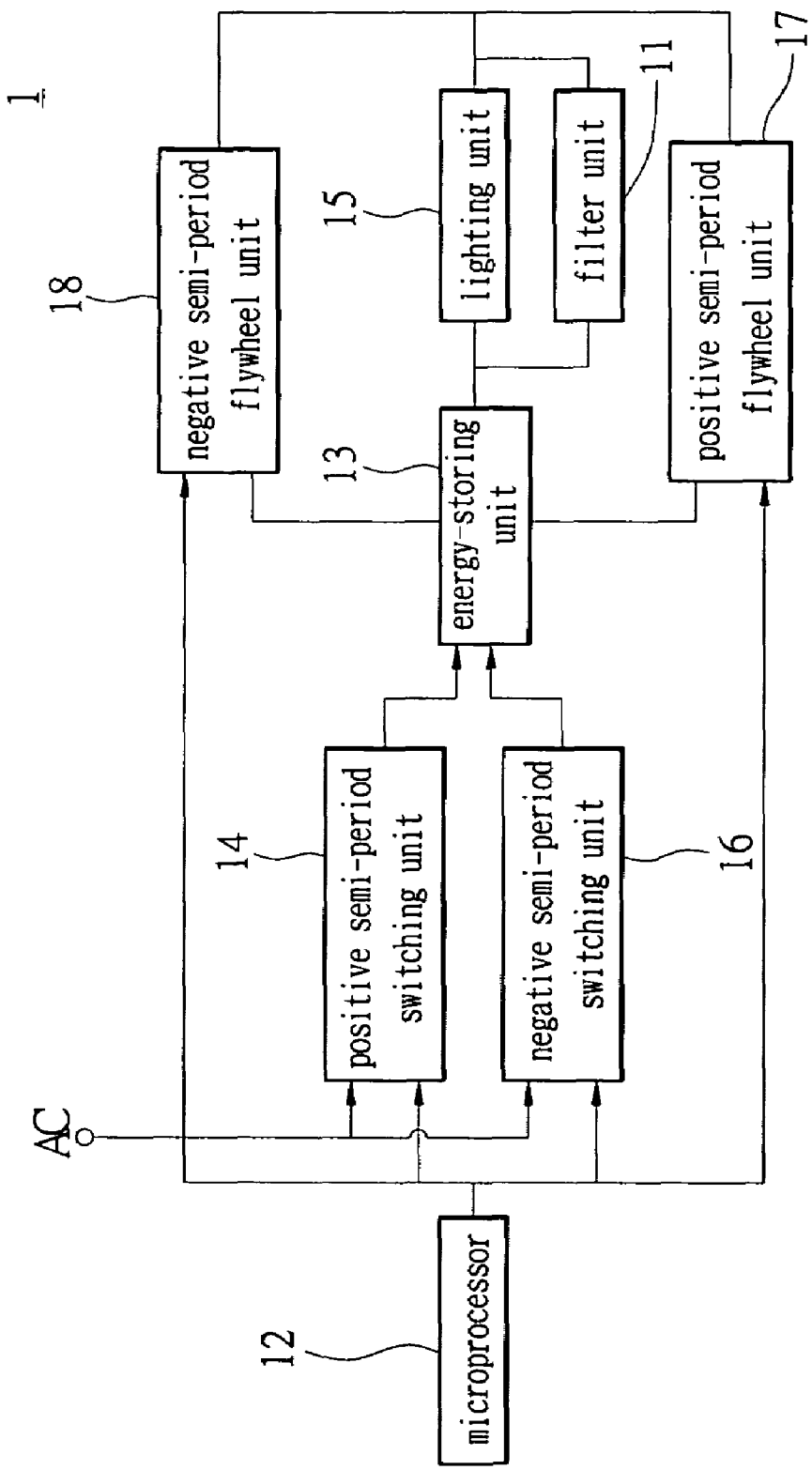
FIG. 3 is a circuit block diagram of the preferred embodiment of the present invention.

Please refer to FIG. 3, which shows a circuit block diagram of the preferred embodiment of the present invention. The sine wave light-adjusting apparatus 1 of the present invention is controlled by a microprocessor 12 and adjusts a sine wave voltage AC for providing it to a lighting unit 15. The sine wave light-adjusting apparatus 1 includes an energy-storing unit 13 connected with the lighting unit 15, a positive semi-period switching unit 14 connected with the energy-storing unit 13 and controlled by the microprocessor 12 to execute the switching operation during the positive semi-period of the sine wave voltage AC, a negative semi-period switching unit 16 connected with the energy-storing unit 13 and controlled by the microprocessor 12 to execute the switching operation during the negative semi-period of the sine wave voltage AC, a positive semi-period flywheel unit 17 connected with the energy-storing unit 13 and the lighting unit 15 and controlled by the microprocessor 12 to conduct during the positive semi-period of the sine wave voltage AC, and a negative semi-period flywheel unit 18 connected with the energy-storing unit 13 and the lighting unit 15 and controlled by the microprocessor 12 to conduct during the negative semi-period of the sine wave voltage AC.

The sine wave light-adjusting apparatus 1 further includes a filter unit 11 connected with the lighting unit 15. In this embodiment, the filter unit 11 is a capacitor. The energy-storing unit 13 is an inductor. The positive semi-period switching unit 14 is composed of a positive semi-period rectifier diode and a positive semi-period switch that are connected together. The positive semi-period switch is an insulation gate bipolar transistor (IGBT). The negative semi-period switching unit 16 is composed of a negative semi-period rectifier diode and a negative semi-period switch that are connected together. The negative semi-period switch is an insulation gate bipolar transistor (IGBT). The positive semi-period flywheel unit 17 is a Silicon Controlled Rectifier (SCR). The negative semi-period flywheel unit 18 is a Silicon Controlled Rectifier (SCR).

Figure 4:
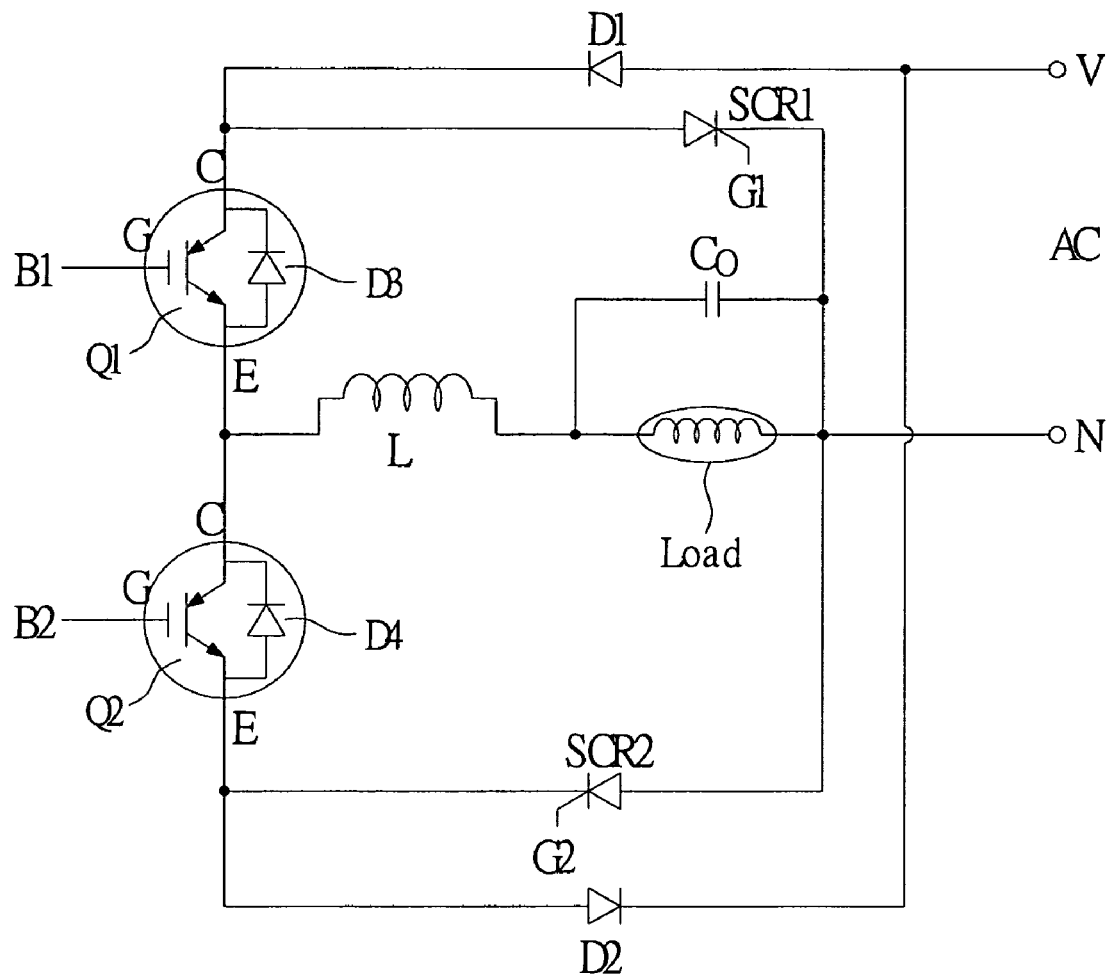
FIG. 4 is a schematic diagram of a circuit of the preferred embodiment of the present invention.

Please refer to FIGS. 3 and 4. FIG. 4 is a schematic diagram of a circuit of the preferred embodiment of the present invention. The sine wave light-adjusting apparatus 1 includes an inductor L connected with the lighting unit Load, a first insulation gate bipolar transistor (IGBT) Q1 having a control end G, a collector end C and an emitter end E. The control end G is connected with the microprocessor 12 and the emitter end E is connected with one end of the inductor L. The first insulation gate bipolar transistor (IGBT) Q1 further includes a forward diode D3 connected between the collector end C and the emitter end E. The sine wave light-adjusting apparatus 1 also includes a positive semi-period rectifier diode D1 having a positive end and a negative end. The negative end is connected with the collector end C of the first insulation gate bipolar transistor (IGBT) Q1 and the positive end receives the sine wave voltage AC. The sine wave light-adjusting apparatus 1 also includes a first Silicon Controlled Rectifier SCR1 having a positive end, a negative end and a triggering end. The positive end is connected with the collector end C of the first insulation gate bipolar transistor (IGBT) Q1, the negative end is connected with the lighting unit Load, and the triggering end is connected with the microprocessor 12.

The sine wave light-adjusting apparatus 1 also includes a second insulation gate bipolar transistor (IGBT) Q2 having a control end G, a collector end C and an emitter end E. The control end G is connected with the microprocessor 12 and the collector end C is connected with the emitter end E of the first insulation gate bipolar transistor (IGBT) Q1. The second insulation gate bipolar transistor (IGBT) Q2 further includes a forward diode D4 connected between the collector end C and the emitter end E. The sine wave light-adjusting apparatus 1 also includes a negative semi-period rectifier diode D2 having a positive end and a negative end. The positive end is connected with the emitter end E of the second insulation gate bipolar transistor (IGBT) Q2 and the negative end receives the sine wave voltage AC. The sine wave light-adjusting apparatus 1 also includes a second Silicon Controlled Rectifier SCR2 having a positive end, a negative end and a triggering end G2. The negative end is connected with the emitter end E of the second insulation gate bipolar transistor (IGBT) Q2, the positive end is connected with the lighting unit Load, and the triggering end is connected with the microprocessor 12. The sine wave light-adjusting apparatus 1 also includes a capacitor C0 connected with the lighting unit Load and is used for filter to provide a sine wave output voltage to the lighting unit Load.

Figure 5:
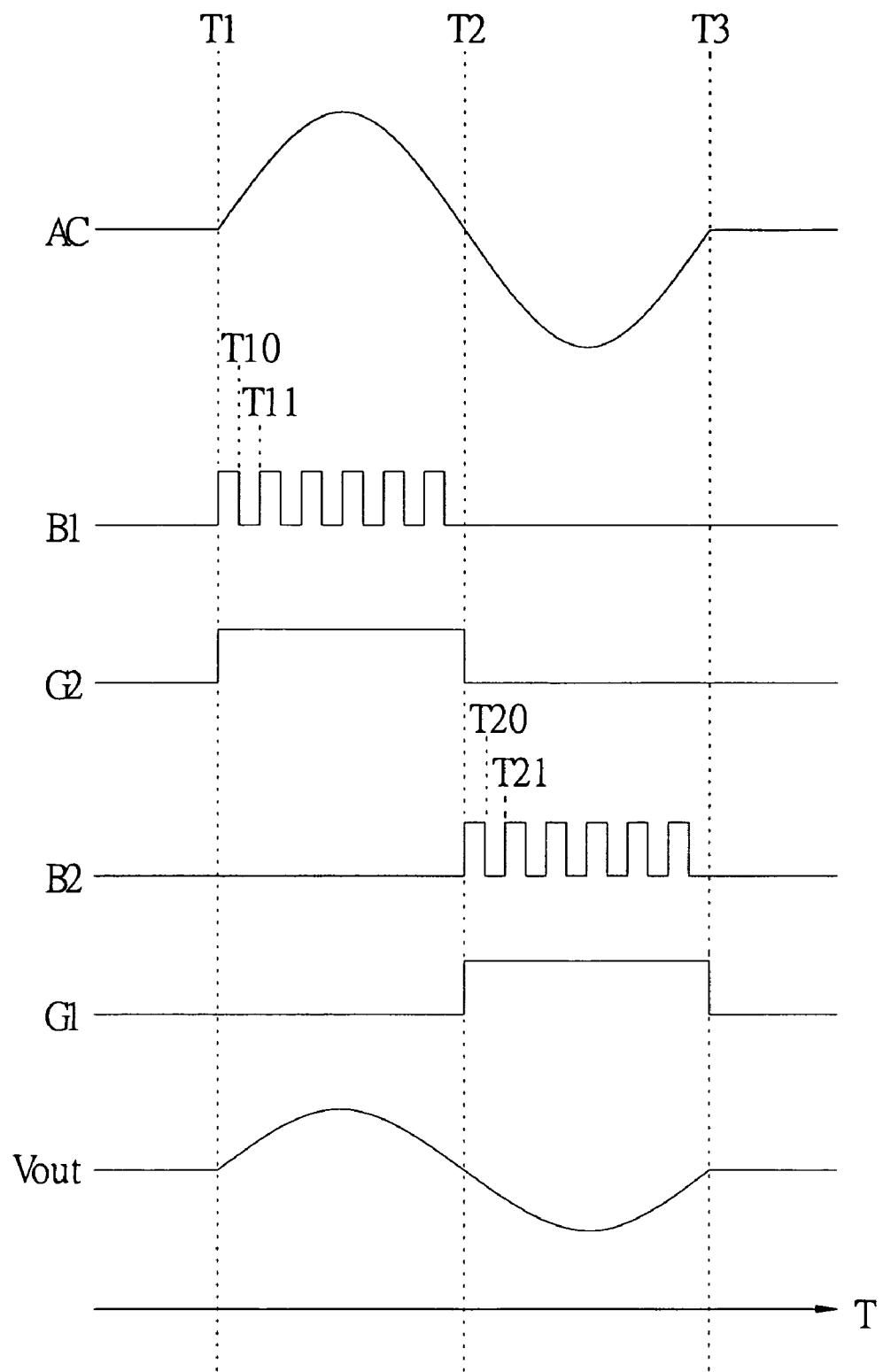
FIG. 5 is a schematic diagram of control waveforms used in the present invention.

Please refer to FIGS. 4 and 5. FIG. 5 is a schematic diagram of control waveforms used in the present invention. In the FIG. 5, the control waveform used in the present invention is provided by the microprocessor 12 shown in the FIG. 3. The microprocessor 12 obtains the zero-crossing signal of the sine wave voltage AC and adjusts and outputs a duty-cycle of PWM control signals B1 and B2 and triggering signals G1 and G2 according to a light-adjusting signal. The present invention utilizes the adjustment of the duty-cycle of the PWM control signals B1 and B2 and the generation of the triggering signals G1 and G2 to adjust the sine wave output voltage Vout on the capacitor C0 and output it to the lighting unit Load. Therefore, the light-adjusting effect is achieved.

Figure 6A:
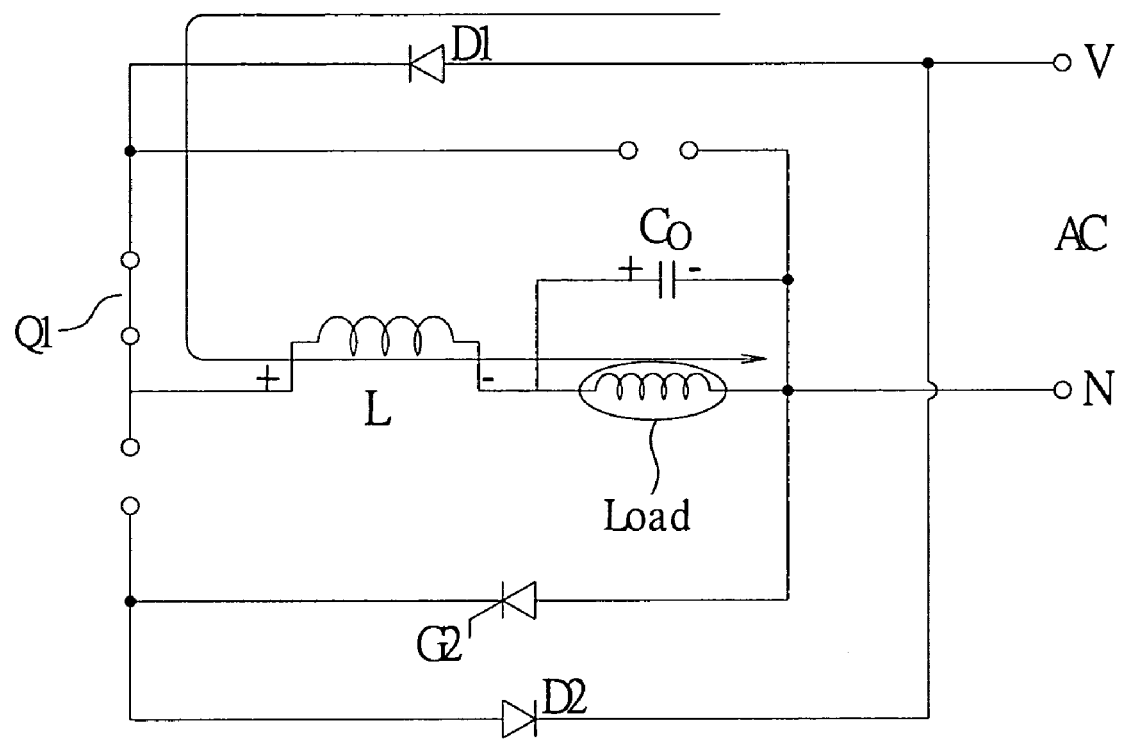
FIGS. 6A & 6B are schematic diagrams of the circuit operated during the present invention is operated within the positive semi-period of the sine wave voltage.
Figure 6B:
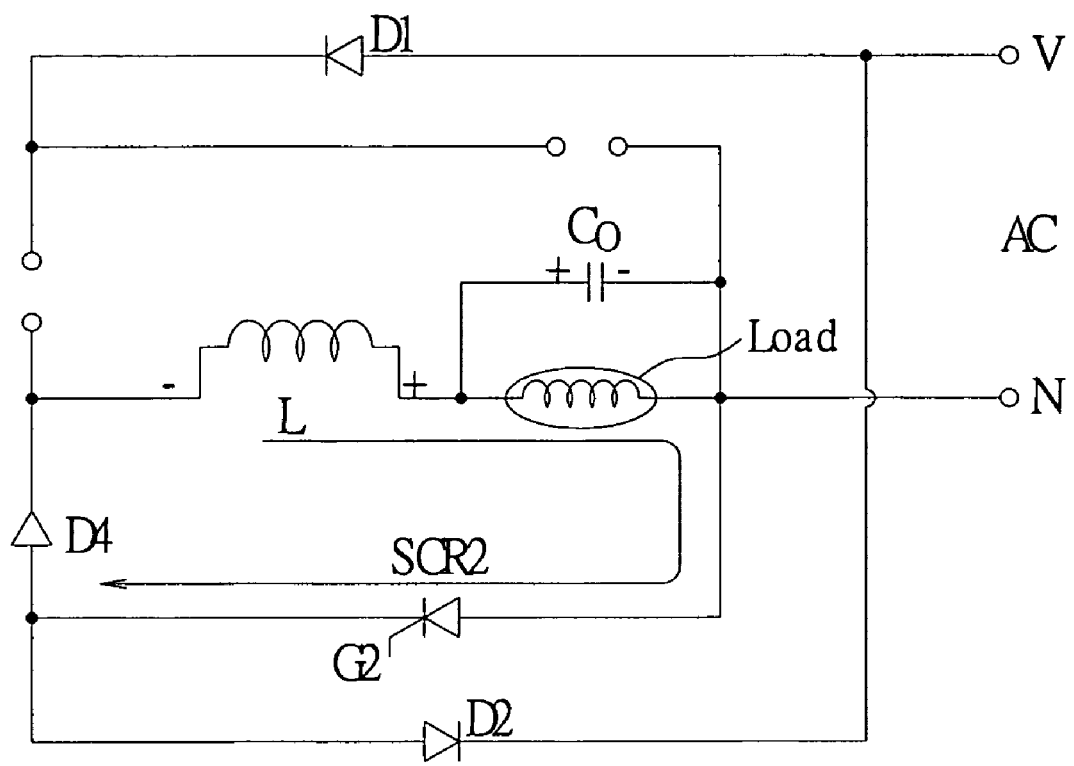

Pleaser refer to FIGS. 4, 5, 6A and 6B. FIGS. 6A and 6B are schematic diagrams of the circuit operated during the present invention is operated within the positive semi-period of the sine wave voltage. When the sine wave voltage AC is on the positive semi-period (T1 to T2), the microprocessor 12 outputs the PWM control signal B1 to the first insulation gate bipolar transistor (IGBT) Q1, and outputs the triggering signal G2 to conduct the second Silicon Controlled Rectifier SCR2. During the period of T1 to T10, the PWM control signal B1 controls and conducts the first Silicon Controlled Rectifier SCR1. At this time, the positive semi-period of the sine wave voltage AC forms a loop via the positive semi-period rectifier diode D1, the first insulation gate bipolar transistor (IGBT) Q1, the inductor L, the capacitor C0 and the lighting unit Load, as shown in the FIG. 6A. During the period of T10 to T11, the PWM control signal B1 controls and cuts off the first insulation gate bipolar transistor (IGBT) Q1. At this time, the energy stored on the inductor L forms a loop via the capacitor C0, the lighting unit Load, the second Silicon Controlled Rectifier SCR2 and the forward diode D4, as shown in the FIG. 6B.

Figure 6C:
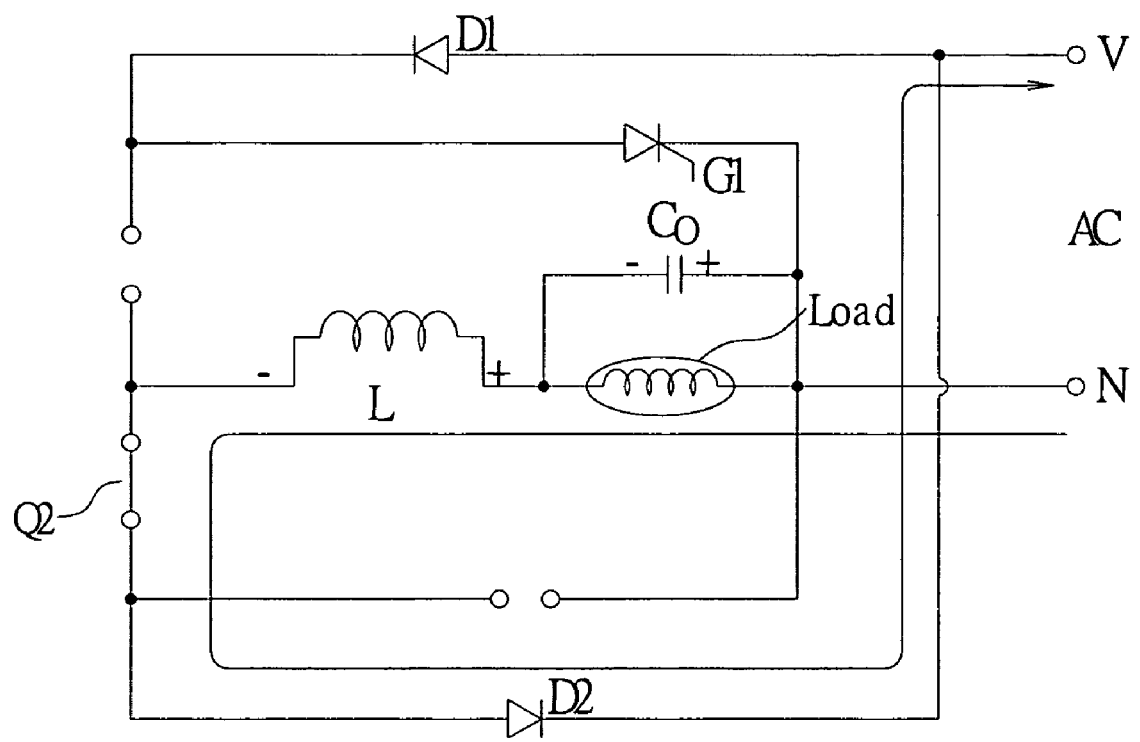
FIGS. 6C & 6D are schematic diagrams of the circuit operated during the present invention is operated within the negative semi-period of the sine wave voltage.
Figure 6D:
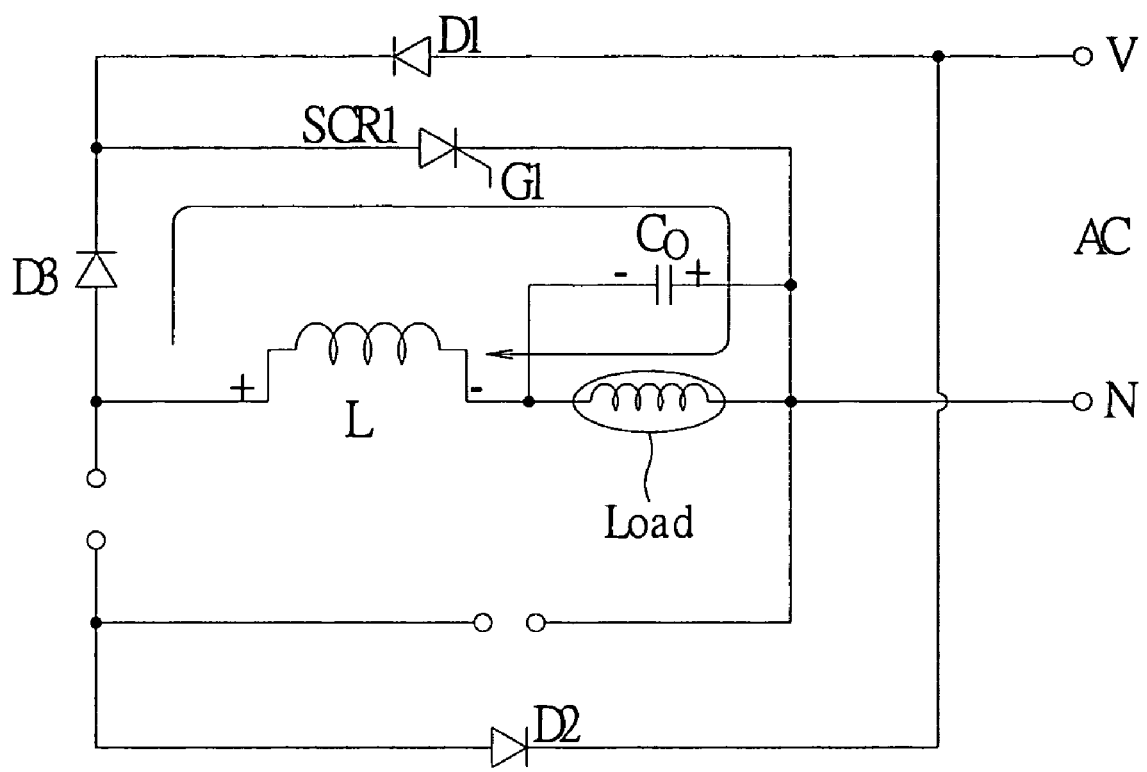

Pleaser refer to FIGS. 4, 5, 6C and 6D. FIGS. 6C and 6D are schematic diagrams of the circuit operated during the present invention is operated within the negative semi-period of the sine wave voltage. When the sine wave voltage AC is on the negative semi-period (T2 to T3), the microprocessor 12 outputs the PWM control signal B2 to the second insulation gate bipolar transistor (IGBT) Q2, and outputs the triggering signal G1 to conduct the first Silicon Controlled Rectifier SCR1. During the period of T2 to T20, the PWM control signal B2 controls and conducts the second insulation gate bipolar transistor (IGBT) Q2. At this time, the negative semi-period of the sine wave voltage AC forms a loop via the negative semi-period rectifier diode D2, the second insulation gate bipolar transistor (IGBT) Q2, the inductor L, the capacitor C0 and the lighting unit Load, as shown in the FIG. 6C. During the period of T20 to T21, the PWM control signal B2 controls and cuts off the second insulation gate bipolar transistor (IGBT) Q2. At this time, the energy stored on the inductor L forms a loop via the capacitor C0, the lighting unit Load, the first Silicon Controlled Rectifier SCR1 and the forward diode D3, as shown in the FIG. 6D.

Please refer to FIG. 5 again. The microprocessor 12 adjusts and outputs the duty-cycle of PWM control signals B1 and B2 and triggering signals G1 and G2 according to a light-adjusting signal. The present invention utilizes the adjustment of the duty-cycle of the PWM control signals B1 and B2 and the generation of the triggering signals G1 and G2 to adjust the sine wave output voltage Cav on the capacitor C0 and output it to the lighting unit Load. Therefore, the outputted power rate is determined and the light-adjusting effect is achieved.

The light-adjusting apparatus of the present invention adjusts the input sine wave voltage and output a desired output sine wave voltage to the lamp according to the desired brightness of the lamp to achieve the light-adjusting effect by adjusting the switching period of a switch and utilizing a flywheel effect. Because the waveform of the voltage outputted to the lamp is a sine wave, the difference with the input sine wave voltage merely is the magnitude of the wave amplitude.

Therefore, when the sine wave light-adjusting apparatus of the present invention is used for adjusting the brightness of the lamp, the power factor is higher and the energy can be adequately utilized. The present invention can improves the drawbacks of the light-adjusting apparatus with a Phase Modulation method of the prior art, such as power factor is low and the energy is wasted, due to it controls the discontinuous and deformed output voltage Vout to provide the power for the loading.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A sine wave light-adjusting apparatus, controlled by a microprocessor and used for adjusting a sine wave voltage for providing it to a lighting unit, comprising:
    an energy-storing unit, connected with the lighting unit;
    a positive semi-period switching unit, connected with the energy-storing unit and controlled by the microprocessor to execute a switching operation during the positive semi-period of the sine wave voltage;
    a negative semi-period switching unit, connected with the energy-storing unit and controlled by the microprocessor to execute the switching operation during the negative semi-period of the sine wave voltage;
    a positive semi-period flywheel unit, connected with the energy-storing unit and the lighting unit and controlled by the microprocessor to conduct during the positive semi-period of the sine wave voltage; and
    a negative semi-period flywheel unit, connected with the energy-storing unit and the lighting unit and controlled by the microprocessor to conduct during the negative semi-period of the sine wave voltage.

2. The sine wave light-adjusting apparatus as claimed in claim 1, further comprising a filter unit, connected with the lighting unit.

3. The sine wave light-adjusting apparatus as claimed in claim 2, wherein the filter unit is a capacitor.

4. The sine wave light-adjusting apparatus as claimed in claim 1, wherein the energy-storing unit is an inductor.

5. The sine wave light-adjusting apparatus as claimed in claim 1, wherein the positive semi-period switching unit is composed of a positive semi-period rectifier diode and a positive semi-period switch that both are connected together.

6. The sine wave light-adjusting apparatus as claimed in claim 5, wherein the positive semi-period switch is an insulation gate bipolar transistor (IGBT).

7. The sine wave light-adjusting apparatus as claimed in claim 1, wherein the negative semi-period switching unit is composed of a negative semi-period rectifier diode and a negative semi-period switch that both are connected together.

8. The sine wave light-adjusting apparatus as claimed in claim 7, wherein the negative semi-period switch is an insulation gate bipolar transistor (IGBT).

9. The sine wave light-adjusting apparatus as claimed in claim 1, wherein the positive semi-period flywheel unit is a Silicon Controlled Rectifier (SCR).

10. The sine wave light-adjusting apparatus as claimed in claim 1, wherein the negative semi-period flywheel unit is a Silicon Controlled Rectifier (SCR).

11. A sine wave light-adjusting apparatus, controlled by a microprocessor and used for adjusting a sine wave voltage for providing it to a lighting unit, comprising:
    an inductor, connected with the lighting unit;
    a first insulation gate bipolar transistor (IGBT1), having a control end, a collector end and an emitter end; wherein the control end is connected with the microprocessor and the emitter end is connected with one end of the inductor;
    a positive semi-period rectifier diode, having a positive end and a negative end; wherein the negative end is connected with the collector end of the first insulation gate bipolar transistor (IGBT1) and the positive end receives the sine wave voltage;
    a first Silicon Controlled Rectifier, having a positive end, a negative end and a triggering end; wherein the positive end is connected with the collector end of the first insulation gate bipolar transistor (IGBT1), the negative end is connected with the lighting unit, and the triggering end is connected with the microprocessor;
    a second insulation gate bipolar transistor (IGBT2), having a control end, a collector end and an emitter end; wherein the control end is connected with the microprocessor and the collector end is connected with the emitter end of the first insulation gate bipolar transistor (IGBT1);
    a negative semi-period rectifier diode, having a positive end and a negative end; wherein the positive end is connected with the emitter end of the second insulation gate bipolar transistor (IGBT2) and the negative end receives the sine wave voltage; and
    a second Silicon Controlled Rectifier, having a positive end, a negative end and a triggering end; wherein the negative end is connected with the emitter end of the second insulation gate bipolar transistor (IGBT2), the positive end is connected with the lighting unit, and the triggering end is connected with the microprocessor.

12. The sine wave light-adjusting apparatus as claimed in claim 11, further comprising a capacitor, connected with the lighting unit.

* * * * *